No. 727,776. PATENTED MAY 12, 1903.
G. FORBES.
TELESCOPE.
APPLICATION FILED FEB. 6, 1903.
NO MODEL.
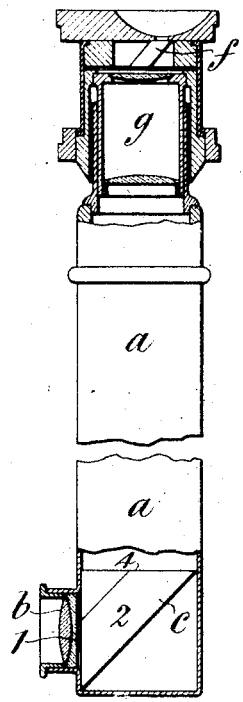
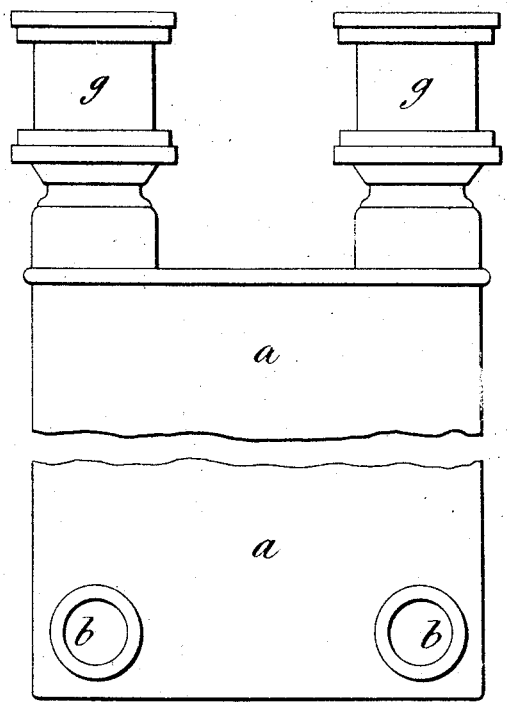
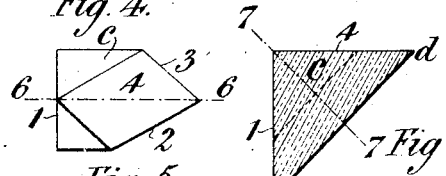
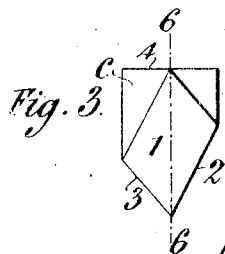
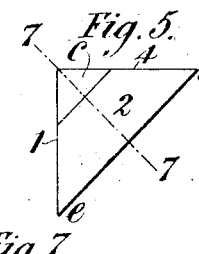
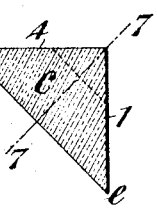
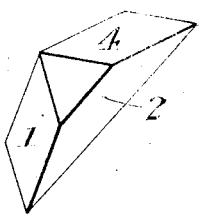
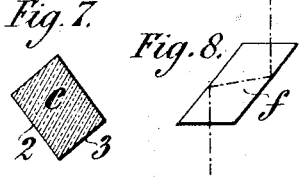
Witnesses.
J. M. Parkins.
J. A. MacDonald.
Inventor:
George Forbes,
By his Attorneys,
Baldwin, Davidson & Wight.

No. 727,775. Patented May 12, 1903.

UNITED STATES PATENT OFFICE.

GEORGE FORBES, OF WESTMINSTER, ENGLAND.

TELESCOPE.

SPECIFICATION forming part of Letters Patent No. 727,776, dated May 12, 1903.

Application filed February 6, 1903. Serial No. 142,202. (No model.)

*To all whom it may concern:*

Be it known that I, GEORGE FORBES, Fellow of the Royal Society, a subject of the King of Great Britain, residing at 34 Great George street, in the city of Westminster, England, have invented certain new and useful Improvements in Telescopes, of which the following is a specification.

This invention relates to telescopes of the class in which an erect image is obtained by internal reflections in a prism instead of by an erecting eyepiece; and its object is to obtain this end without the loss of light and also to provide a ready adjustment for the varying distance between the eyes of different observers without changing the distance between the objectives. When two telescopes are combined to form a binocular, the distance between the eyes is varied by means of a rhomboidal prism of glass, which by two internal reflections sends the ray into the eye, not along the axis of the telescope, but parallel to it. Thus by rotating one or both eyepieces about the optic axis the distance between the rays is changed.

Figure 1 is a sectional side elevation, and Fig. 2 is a front elevation, of a binocular telescope made according to this invention. Fig. 3 is a front elevation, to a larger scale, of one of the prisms $c$. Fig. 4 is a plan. Fig. 5 is a side elevation, and Figs. 6 are each a section on the lines 6 6, Figs. 3 and 4, but looking in opposite directions. Fig. 7 is a section on the line 7 7, Figs. 5 and 6. Fig. 7$^a$ is a perspective view of one of the prisms. Fig. 8 is a side elevation, to a larger scale, of one of the prisms $f$.

$a$ is the casing, and $b$ are the objectives fixed in the casing, their distance apart being therefore constant.

$c$ is the prism. (Shown separately at Figs. 3 to 6.) It has four operative faces 1, 2, 3, and 4, the ray from the objective entering the prism at the face 1 being totally reflected internally at the faces 2 and 3 and emerging at the face 4, from whence it passes to the eyepiece. The faces 1 and 4 are at right angles to each other, as shown at Figs. 5 and 6, and so, also, are the faces 2 and 3, as shown at Fig. 7. The line of intersection $d\,e$ of the faces 2 and 3 makes an angle of forty-five degrees with the faces 1 and 4, as shown at Figs. 6. The effect of the prism $c$ is to reverse the image, so that a correct image is obtained without the use of an erecting eyepiece, and since the reflections at the faces 2 and 3 are total internal reflections there is practically no loss of light.

$f$ is a rhomboidal prism in the ordinary astronomical eyepiece $g$. As shown at Fig. 8, the effect of the prism $f$ is to deflect the ray sidewise, so that it no longer passes along the axis of the telescope, but parallel to it, so that by rotating one or both of the eyepieces about the optic axis the distance between the rays is changed.

What I claim is—

1. The combination of an objective, an eyepiece and a prism having four operative faces, namely a pair of transmitting-faces and a pair of reflecting-faces, the faces of each pair being at right angles to each other and the line of intersection of the faces of one pair making an angle of forty-five degrees with the faces of the other pair.

2. The combination with a telescopic eyepiece of a rhomboidal prism free to rotate about the optic axis.

GEORGE FORBES.

Witnesses:
FREDK. C. WEATHERLY.
GEORGE F. BRIDGES.